(12) United States Patent
Antonatos et al.

(10) Patent No.: US 10,997,279 B2
(45) Date of Patent: May 4, 2021

(54) WATERMARKING ANONYMIZED DATASETS BY ADDING DECOYS

(71) Applicant: INTERNATIONAL BUSINESS MACHINES CORPORATION, Armonk, NY (US)

(72) Inventors: Spyridon Antonatos, Dublin (IE); Stefano Braghin, Blanchardstown (IE); Naoise Holohan, Dublin (IE); Pol MacAonghusa, Carbury (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 15/859,950

(22) Filed: Jan. 2, 2018

(65) Prior Publication Data
US 2019/0205507 A1 Jul. 4, 2019

(51) Int. Cl.
| | |
|---|---|
| G06F 21/16 | (2013.01) |
| G06F 21/55 | (2013.01) |
| H04L 29/06 | (2006.01) |
| G06F 21/62 | (2013.01) |

(52) U.S. Cl.
CPC ............ *G06F 21/16* (2013.01); *G06F 21/552* (2013.01); *H04L 63/1416* (2013.01); *H04L 63/1491* (2013.01); *G06F 21/6254* (2013.01); *G06F 2221/0733* (2013.01)

(58) Field of Classification Search
CPC .... G06F 21/16; G06F 21/552; G06F 21/6254; G06F 2221/0733; H04L 63/1416
See application file for complete search history.

(56) References Cited

U.S. PATENT DOCUMENTS

| | | | |
|---|---|---|---|
| 6,885,757 B2 | 4/2005 | Bloom et al. | |
| 8,259,938 B2 | 9/2012 | Petrovic et al. | |
| 8,340,348 B2 | 12/2012 | Petrovic et al. | |
| 8,750,518 B2 | 6/2014 | Trinkel et al. | |
| 8,930,896 B1* | 1/2015 | Wiggins | G06F 9/5072 717/115 |
| 9,152,808 B1* | 10/2015 | Ramalingam | G06F 21/62 |
| 2003/0195852 A1* | 10/2003 | Campbell | G06F 21/10 705/51 |
| 2012/0036135 A1* | 2/2012 | Fu | G06F 16/24578 707/748 |
| 2013/0297737 A1 | 11/2013 | Wajs et al. | |
| 2016/0140544 A1* | 5/2016 | Howe | G06Q 20/383 705/74 |
| 2016/0224804 A1* | 8/2016 | Carasso | G06F 16/2322 |

OTHER PUBLICATIONS

Prihandoko et al., "Deterring Traitor Using Double Encryption Scheme," 2013 IEEE International Conference on Communication, Networks and Satellite (COMNETSAT), 2013 (5 pages).
Xian et al., "Leakage Identification for Secret Relational Data Using Shadowed Watermarks," 2009 International Conference on Communication Software and Networks, 2009 (6 pages).

* cited by examiner

*Primary Examiner* — Samson B Lemma
*Assistant Examiner* — Zoha Piyadehghibi Tafaghodi
(74) *Attorney, Agent, or Firm* — Griffiths & Seaton PLLC (57) ABSTRACT

Embodiments for watermarking anonymized datasets using decoys in a computing environment are provided. One or more decoy records may be embedded in an anonymized dataset such that a re-identification attack on the anonymized dataset targets the one or more decoy records.

20 Claims, 7 Drawing Sheets

WATERMARKING ANONYMIZED DATASETS BY ADDING DECOYS

BACKGROUND OF THE INVENTION

Field of the Invention

The present invention relates in general to computing systems, and more particularly to, various embodiments for watermarking anonymized datasets by adding decoy records using a computing processor.

Description of the Related Art

In today's interconnected and complex society, computers and computer-driven equipment are more commonplace. Processing devices, with the advent and further miniaturization of integrated circuits, have made it possible to be integrated into a wide variety of devices. The advent of computers and networking technologies have made possible the intercommunication of people from one side of the world to the other. However, ensuring data integrity from various types of computing attacks are a continuous challenge to address.

SUMMARY OF THE INVENTION

Various embodiments for identifying re-identification attacks on anonymized datasets shared with third party entities in a computing environment are provided. In one embodiment, by way of example only, a method for tracing re-identification attacks on anonymized datasets by means of adding decoy records, by a processor, is provided. One or more decoy records may be embedded in an anonymized dataset such that a re-identification attack on the anonymized dataset targets the one or more decoy records.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

In recent years, people have been witnessing a data explosion with data being estimated in the order of zettabytes. Analyzing this wealth and volume of data offers remarkable opportunities for growth in various business sectors for a company, e.g., including healthcare, telecommunications, banking and smarter cities management, among many others. However, the majority of these datasets are proprietary and many contain personal and/or business sensitive information. Examples of sensitive data include patient records, special housing information, tax records, customer purchase records, mobile call detail records (CDR), etc.

In some situations, these various organizations desire to share the datasets with third parties. Due to worldwide privacy regulations governing different types of person-specific data, such as patient data in electronic health records, user data may be required to be anonymized before being shared with third parties. That is, the privacy of individuals is protected by employing anonymization techniques on the original datasets (e.g., masking, k-anonymity, differential privacy, etc.). However, re-identification attacks may occur at the third party side without the consent or knowledge of the original data owner. Re-identification attacks reverse the effect of anonymization and are able to identify the real identity for one or more records in the anonymized dataset. Moreover, it is extremely difficult, if not impossible, to trace if a third party performed a re-identification attack and which third party was the source of the attack.

Accordingly, various embodiments as described herein provide a novel solution that embeds decoys (e.g., decoy records) in the anonymized datasets. Such decoys are in the form of "fake" and/or "realistic records" (e.g., decoy records) that have a high chance or probability to yield a successful re-identification attack. Decoy records may be fake or real and either belong to a real or fake individual. Unique decoy records may be inserted into the anonymized datasets for each third party. If a re-identification attack is performed on the decoy records, the re-identification attack may be detected such as, for example, by tracing re-identification attacks on anonymized datasets by means of the decoy records. The decoy records are used to accurately define and identify the source of the attack because the decoy records are unique per third party entity.

In an additional aspect, the one or more decoy records may be embedded and injected in the anonymized dataset such that a re-identification attack on the anonymized dataset targets the one or more decoy records. That is, the decoys may be embedded in anonymized datasets in the form of high-risk equivalence classes that are unrelated to the original data, prior to anonymization. The embedding of decoys in anonymized data may be performed in an oblivion manner from the point of view of the executing environment. The decoy records are inserted into anonymized datasets in the form of high-risk equivalence classes that have a high chance to be targets of re-identification attacks. If re-identification attacks target the decoy records, the decoy records can be traced back to the attack source since decoy records are unique per third party entity. In this way, the present invention extends data protection beyond mere data anonymization but enables data protection by detecting re-identification attacks after the data anonymization is performed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
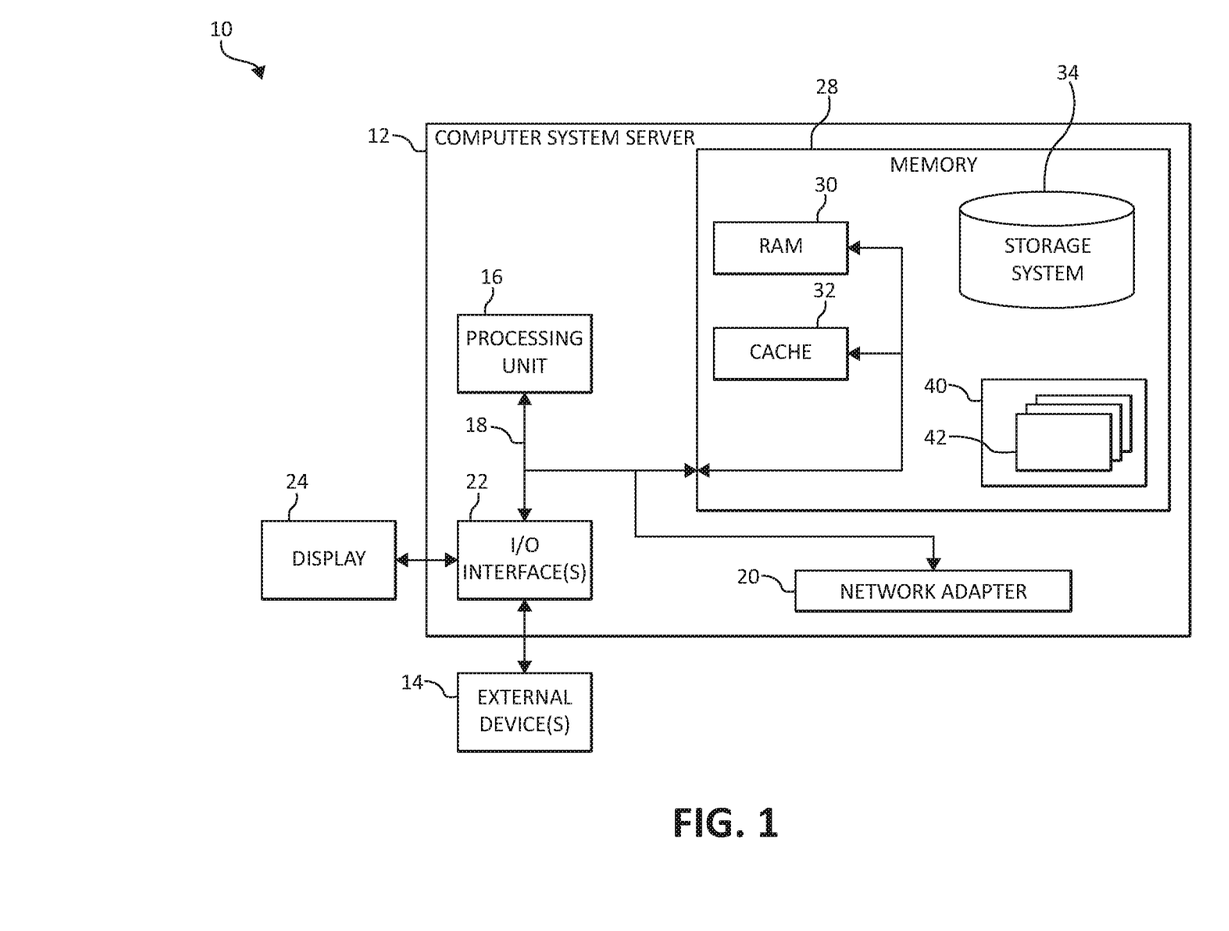
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
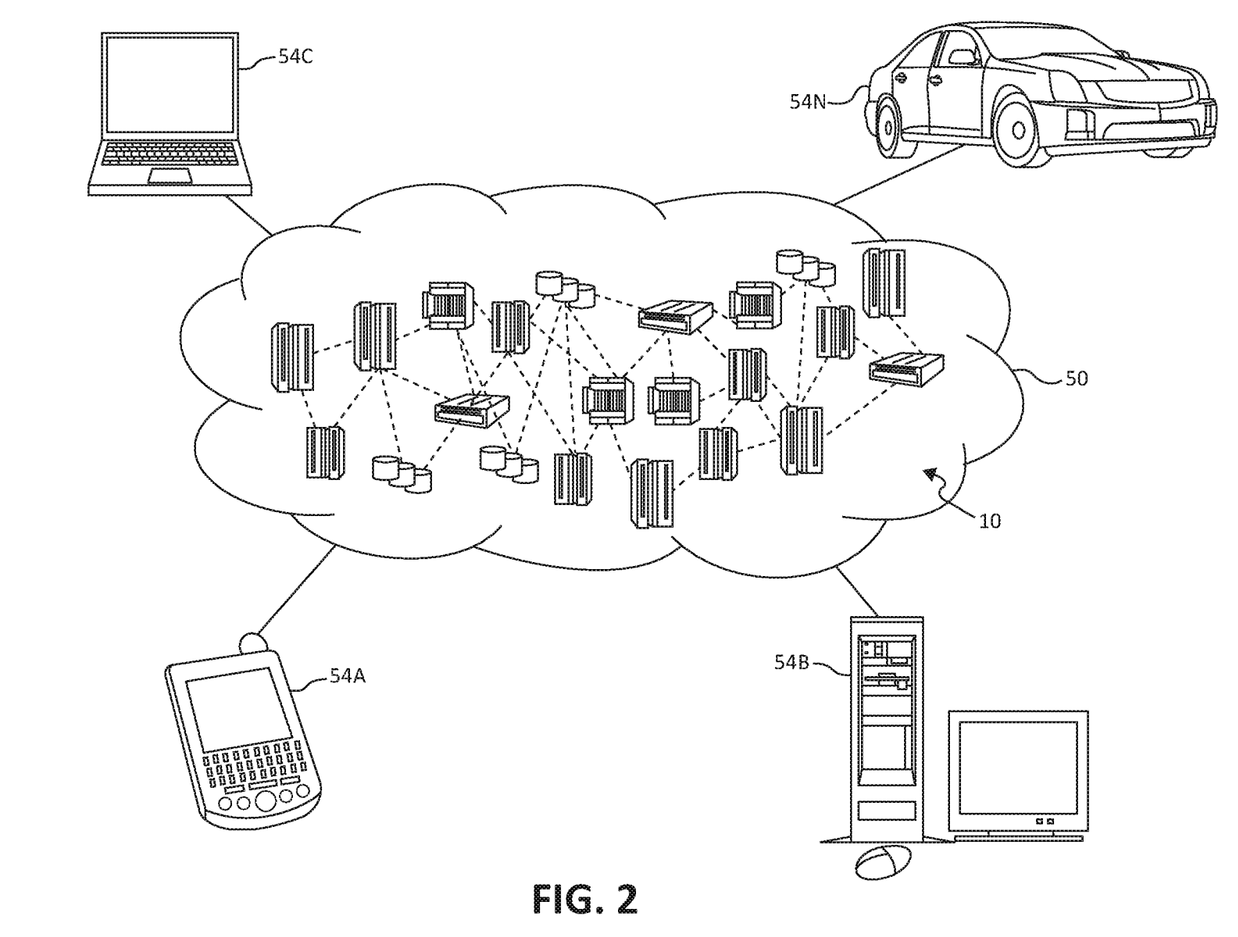
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
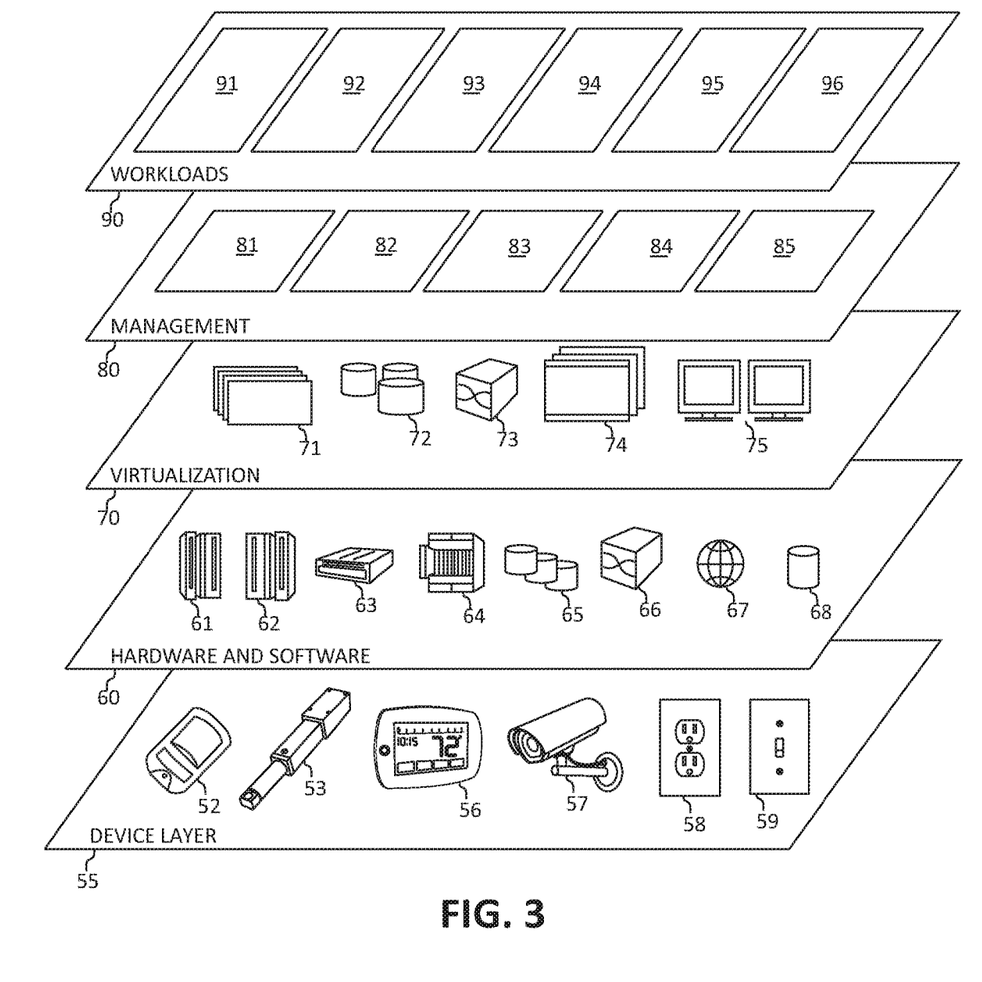
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various re-identification attacks on anonymized datasets identification and tracking workloads and functions 96. In addition, re-identification attacks on anonymized datasets identification and tracking workloads and functions 96 may include such operations as data analysis (including data collection and processing from various environmental sensors) and predictive data analytics functions. One of ordinary skill in the art will appreciate that the re-identification attacks on anonymized datasets identification and tracking workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches to identify and track re-identification attacks on anonymized datasets shared with third parties using decoy records. One or more fake decoy records may be embedded in an anonymized dataset. The embedded decoy records may be based on datasets that are foreign, but linkable, to the anonymized dataset. The present invention ensures that decoy records have an equal or higher risk to be re-identified than a configurable risk. The present invention ensures that the decoy records are unique for each third party that is a recipient of the anonymized dataset that includes the decoy records. The uniqueness facilitates the tracing of a re-identification attack on the anonymized dataset that includes the decoy records back to the third party that received the dataset.

Figure 4:
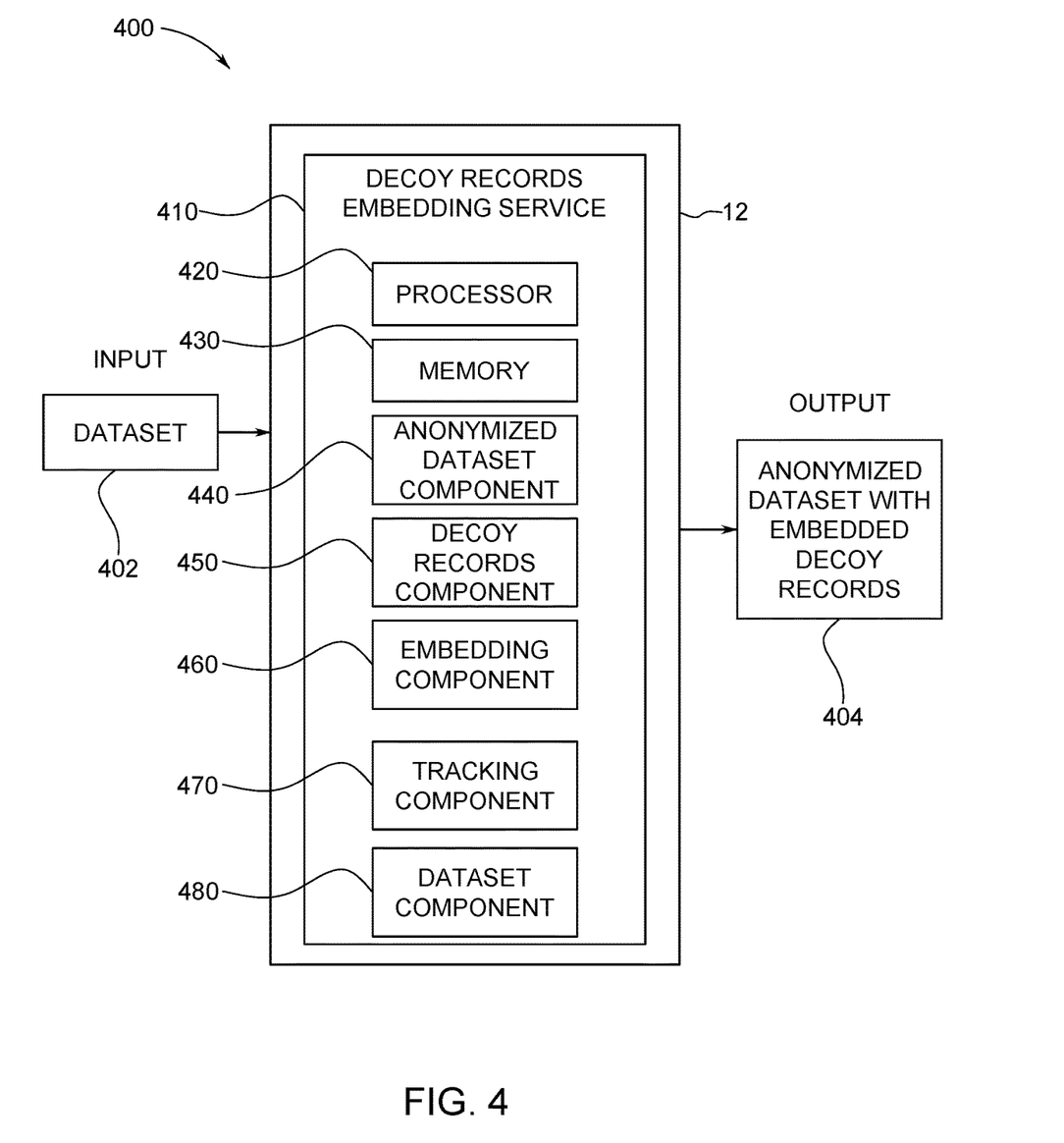
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A decoy records embedding service 410 is shown, incorporating processing unit 420 to perform various computational, data processing and other functionality in accordance with various aspects of the present invention. The decoy records embedding service 410 may be included in computer system/server 12, as described in FIG. 1. The processing unit 420 may be in communication with memory 430. The decoy records embedding service 410 may include an anonymized dataset component 440, a decoy records component 450, an embedding component 460, a tracking component 470 of a knowledge domain, and a dataset component 480.

As one of ordinary skill in the art will appreciate, the depiction of the various functional units in decoy records embedding service 410 is for purposes of illustration, as the functional units may be located within the decoy records embedding service 410 or elsewhere within and/or between distributed computing components.

Responsive to receiving dataset 402 from an enterprise, such as a healthcare company, the anonymized dataset component 440 may perform a data anonymization operation (e.g., data masking, k-anonymity, differential privacy, etc.) on the dataset 402.

The decoy records component 450 may create decoy records based on real data from population datasets (e.g., census datasets, voter list datasets, public datasets, etc.). For example, dataset component 480 may provide the population datasets to use to create the fake datasets that were not in the original dataset 402. The decoy records component 450 may also define a risk threshold. The decoy records component 450 may then ensure that the decoy records have an equal to or higher risk to be re-identified than the risk threshold. The decoy records component 450 may also ensure that the decoy records are unique for each recipient third party.

The embedding component 460 may be used to embed the decoy records into an anonymized dataset. That is, the decoy records, not included in the original dataset 402, may be embedded in anonymized datasets. Thus, an anonymized dataset with embedded decoy records 404 may be shared with a third party.

If, however, a re-identification attack is being performed on the anonymized dataset with embedded decoy records 404, the tracking component 470 may use the unique decoy records to track back to a particular third party. By requiring unique decoy records for each recipient third party, a re-identification attack on the decoy records in the anonymized dataset with embedded decoy records 404 may be linked to the source-attacking third party.

As one of ordinary skill in the art will appreciate, the decoy records embedding service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5:
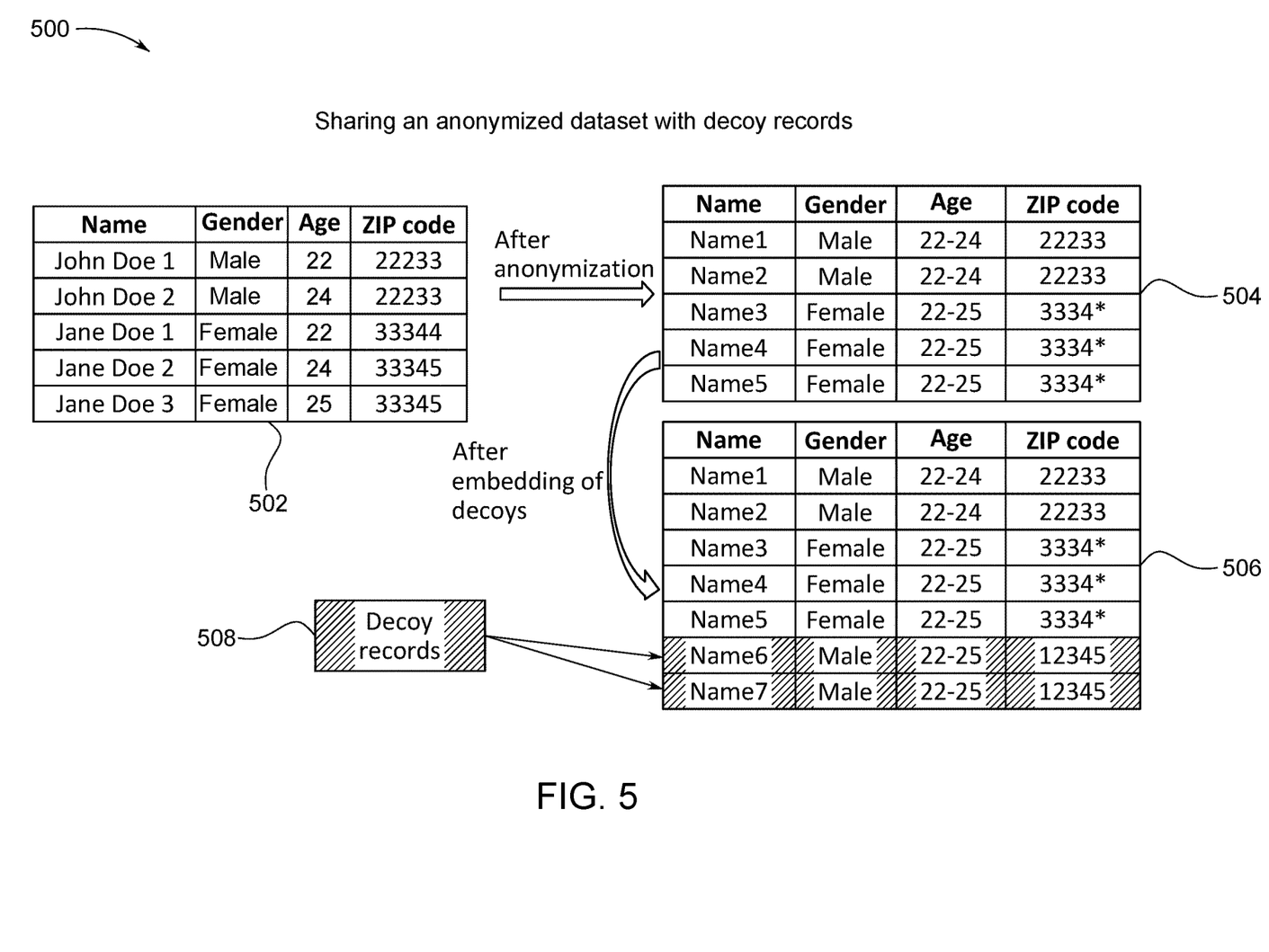
FIG. 5 is a diagram depicting an exemplary sharing of an anonymized dataset with decoy records in accordance with aspects of the present invention.
Figure 6:
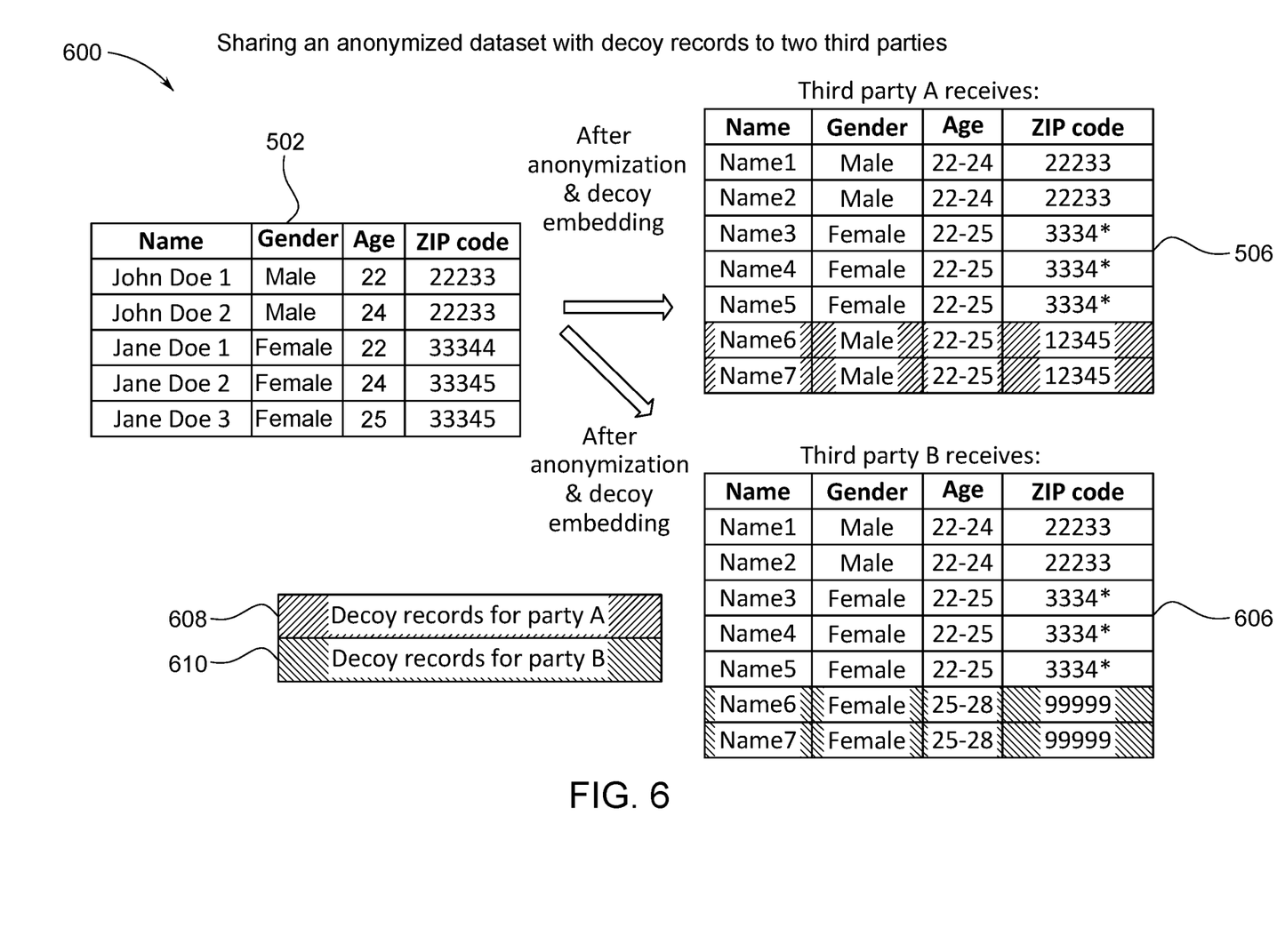
FIG. 6 is a diagram depicting an exemplary sharing of an anonymized dataset with decoy records to at least two third party entities in accordance with aspects of the present invention.

In view of the foregoing, consider the following operation examples illustrated in FIGS. 5-6 of the implementation of the aforementioned functionality. Operations of FIGS. 5-6 may be incorporated into various hardware and software components of a system in accordance with the present invention, such as those described in FIGS. 1-4.

Turning now to FIG. 5, a diagram 500 depicting an exemplary operation of sharing of an anonymized dataset with decoy records is provided. Assume now that in a selected population, a group of male persons in the age range of 22-25 years old that live in zip code 12345 have a high chance or percentage to be re-identified via a re-identification attack. A data anonymization operation may be performed on an original dataset 502 to produce an anonymized dataset 504. For example, a data anonymization operation (e.g., masking) may be performed on the name or surname to randomize the name or surname and k-anonymity may be applied with k equal to two (e.g., k=2) on the gender, age, zip code combinations. In one aspect, the "*" depicted in FIG. 5 and FIG. 6 (described below) may be a selected, defined, or masked numerical value.

One or more decoy records 508, that have a high chance to be re-identified via a re-identification attack, may be embedded into the anonymized dataset 504 to produce anonymized dataset 506 with embedded decoy records. As illustrated, the decoy records 508 have a high chance to be re-identified via a re-identification attack given that the decoy records 508 relate to male persons in the age range of 22-25 years old that live in zip code 12345. Thus, if the anonymized dataset 506 with embedded decoy records 508 are shared with a third party, the third party may receive the anonymized dataset 506 with embedded decoy records 508 unique to the receiving third party. If the third party re-identifies the decoy records, the re-identified attack may be detected with the third party attacking source identified using the decoy records 508 unique to that particular third party. Thus, it is known that the re-identified attack occurred since, for example, the third party reports the attack or contacts one of the re-identified individuals from the decoy records.

Turning now to FIG. 6, diagram 600 depicts an exemplary sharing of an anonymized dataset with decoy records to at least two third party entities. Similar to the example of FIG. 5, assume now that in a given population, a group of male persons in the age range of 22-25 years old that live in zip code 12345 and a group of females that are in the age range of 25-28 years old that live in zip code 99999 each have a high chance or percentage to be re-identified via a re-identification attack.

Similar to FIG. 5, a data anonymization operation may be performed on the original dataset 502 to produce an anonymized dataset 504 of FIG. 5. Decoy records 608 for the group of male persons in the age range of 22-25 years old that live in zip code 12345 may be embedded in dataset 506 (e.g., 506 of FIG. 5). Decoy records 610 for the group of females that are in the age range of 25-28 years old that live in zip code 99999 may be embedded in dataset 606. Both data records 608, 610 have a high chance to be re-identified via a re-identification attack.

Thus, if the anonymized dataset 506 with embedded decoy records 608 is shared with a third party (e.g., third party "A"), the third party "A" may receive the anonymized dataset 506 with embedded decoy records 608 unique to the receiving third party "A". If the anonymized dataset 606 with embedded decoy records 610 is shared with a third party (e.g., third party "B"), third party "B" may receive the anonymized dataset 606 with embedded decoy records 610 unique to the receiving third party "B".

If the third party "A" re-identifies the decoy records 608, the re-identified attack may be detected with the third party "A" attacking source identified using the decoy records 608 unique to third party "A". If the third party "B" re-identifies the decoy records 610, the re-identified attack may be detected with the third party "B" attacking source identified using the decoy records 610 unique to third party "B". Thus, it is known that the re-identified attack occurred since, for example, the third party reports the attack or contacts one of the re-identified individuals from the decoy records 608, 610.

Thus, in summary, the mechanisms of the illustrated embodiments may receive, as input, 1) an original dataset X and 2) the population dataset Y associated with dataset X and a k-value for k-anonymity. That is, the dataset Y may be a dataset from which data X was sampled. For example, dataset Y may be a dataset of persons suffering from a particular illness or disease in a selected country and dataset X may be the persons suffering from the particular illness or disease in a selected region of the selected country. In turn, the mechanisms of the illustrated embodiments produce as an output dataset X" (e.g., X double prime) which may contain the anonymized records of X plus the decoy records.

In operation, the present invention may perform the following steps. Step 1 may include performing data masking on direct identifiers of X (e.g., attributes that uniquely identify individuals such as, for example, names, e-mails, addresses, etc.). X' (e.g., X prime) may be the dataset of X after masking. In step 2, k-anonymity may be achieved on quasi-identifiers of X' (e.g., attributes that can uniquely identify individuals when used in combinations, for example, gender plus age plus zip code). In one aspect, one or more operations that may guarantee k-anonymity can be used. X" may be the output of the k-anonymization process. In step 3, a group of people G in the population dataset Y" (e.g., Y double prime) that have a high chance to be re-identified (group size equal or near the k-value) may be located so as G is not included in X. The target identifiers for re-identification may be the same quasi-identifiers used, for example, in step 2. In one aspect, k-anonymity may be achieved on group G for k equal to the input k-value, using the same operation as in step 2. G' (e.g., G prime) may be the anonymized version of G. The records of G' are the decoy records. Accordingly, in step 4, G' may append to X". In one aspect, the records of X" may be randomly shuffled so that decoy records are not last in an anonymized dataset.

Figure 7:
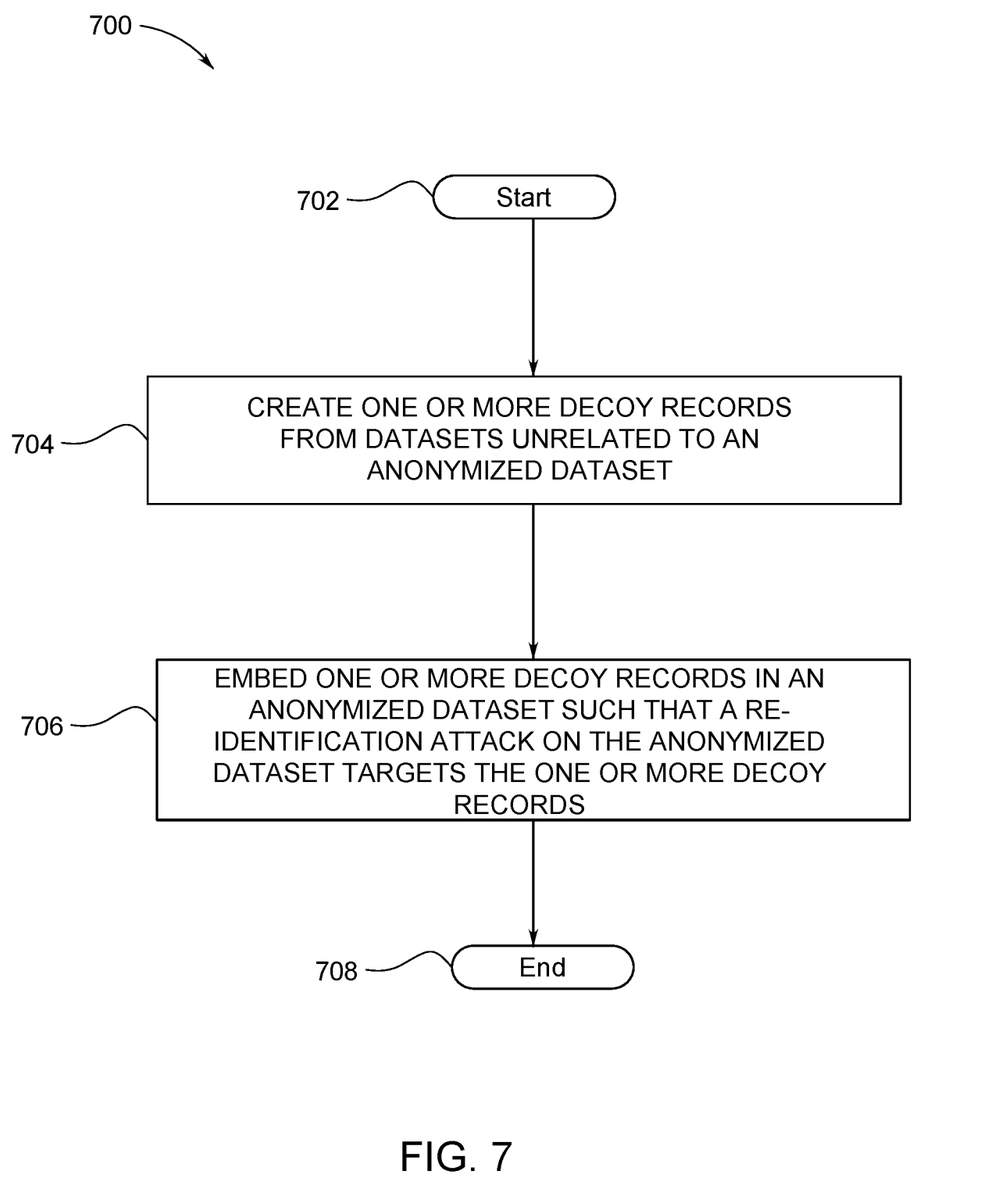
FIG. 7 is a flowchart diagram depicting an additional exemplary method for using decoy records in anonymized datasets in a computing environment in which aspects of the present invention may be realized.

Turning now to FIG. 7, a method 700 for using decoy records in anonymized datasets in a computing environment is depicted, in which various aspects of the illustrated embodiments may be implemented. That is, FIG. 7 is a flowchart of an additional example method 700 for using a memory access broker system with application-controlled early write acknowledgment support in a computing environment according to an example of the present invention. The functionality 700 may be implemented as a method executed as instructions on a machine, where the instructions are included on at least one computer readable storage medium or one non-transitory machine-readable storage medium. The functionality 700 may start in block 702. One or more decoy records may be created from datasets unrelated to an anonymized dataset, as in block 704. That is, the decoy records are based on datasets that are foreign, but linkable, to the anonymized dataset. The one or more decoy records may be embedded in an anonymized dataset such that a re-identification attack on the anonymized dataset targets the one or more decoy records, as in block 706. The functionality 700 may end in block 708.

In one aspect, in conjunction with and/or as part of at least one block of FIG. 7, the operation of 700 may include one or more of each of the following. The operation of 700 may create the one or more decoy records from a population dataset (which is not from an original dataset prior to the dataset being masked) that is linkable with the anonymized dataset. The operation of 700 may define the one or more decoy records to have risk of re-identification equal to or greater than a defined risk threshold, and/or define the one or more decoy records to be unique to each third-party recipient of the anonymized dataset. The one or more decoy records are unique to the third party. Thus, the re-identification attack may be traced to a third-party recipient of the anonymized dataset using the one or more decoy records. The one or more decoy records may be used to identify a third-party executing the re-identification attack.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, implemented by a one or more hardware processors, for watermarking anonymized datasets using decoys in a computing environment, comprising:
    embedding by the one or more hardware processors one or more decoy records in an anonymized dataset such that a re-identification attack on the anonymized dataset to reverse effects of a masking operation resulting in the anonymization targets the one or more decoy records, wherein the one or more decoy records are embedded in the anonymized dataset according to a defined risk threshold representing a probability that the one or more decoy records will be subject to the re-identification attack such that user information used to create the decoy records is chosen based on the user information being known to be desirable based on the user information being subject to previous re-identification attacks.

2. The method of claim 1, further including creating the one or more decoy records from datasets unrelated to the anonymized dataset.

3. The method of claim 1, further including creating the one or more decoy records from a population dataset linkable with the anonymized dataset.

4. The method of claim 1, further including defining the one or more decoy records to have risk of re-identification equal to or greater than the defined risk threshold.

5. The method of claim 1, further including defining the one or more decoy records to be unique to each third-party recipient of the anonymized dataset.

6. The method of claim 1, further including tracing the re-identification attack using the one or more decoy records to a third-party recipient of the anonymized dataset, wherein the one or more decoy records are unique to the third-party.

7. The method of claim 1, further including using the one or more decoy records to identify a third-party executing the re-identification attack.

8. A system for watermarking anonymized datasets using decoys in a computing environment, comprising:
    one or more computers with executable instructions that when executed cause the system to:
        embed one or more decoy records in an anonymized dataset such that a re-identification attack on the anonymized dataset to reverse effects of a masking operation resulting in the anonymization targets the one or more decoy records, wherein the one or more decoy records are embedded in the anonymized dataset according to a defined risk threshold representing a probability that the one or more decoy records will be subject to the re-identification attack such that user information used to create the decoy records is chosen based on the user information being known to be desirable based on the user information being subject to previous re-identification attacks.

9. The system of claim 8, wherein the executable instructions create the one or more decoy records from datasets unrelated to the anonymized dataset.

10. The system of claim 8, wherein the executable instructions create the one or more decoy records from a population dataset linkable with the anonymized dataset.

11. The system of claim 8, wherein the executable instructions define the one or more decoy records to have risk of re-identification equal to or greater than the defined risk threshold.

12. The system of claim 8, wherein the executable instructions define the one or more decoy records to be unique to each third-party recipient of the anonymized dataset.

13. The system of claim 8, wherein the executable instructions trace the re-identification attack using the one or more decoy records to a third-party recipient of the anonymized dataset, wherein the one or more decoy records are unique to the third-party.

14. The system of claim 8, wherein the executable instructions use the one or more decoy records to identify a third-party executing the re-identification attack.

15. A computer program product for, by a processor, watermarking anonymized datasets using decoys in a computing environment, the computer program product comprising a non-transitory computer-readable storage medium having computer-readable program code portions stored therein, the computer-readable program code portions comprising:
    an executable portion that embeds one or more decoy records in an anonymized dataset such that a re-identification attack on the anonymized dataset to reverse effects of a masking operation resulting in the anonymization targets the one or more decoy records, wherein the one or more decoy records are embedded in the anonymized dataset according to a defined risk threshold representing a probability that the one or more decoy records will be subject to the re-identification attack such that user information used to create the decoy records is chosen based on the user information being known to be desirable based on the user information being subject to previous re-identification attacks.

16. The computer program product of claim 15, further including an executable portion that creates the one or more decoy records from datasets unrelated to the anonymized dataset.

17. The computer program product of claim 15, further including an executable portion that creates the one or more decoy records from a population dataset linkable with the anonymized dataset.

18. The computer program product of claim 15, further including an executable portion that:
    defines the one or more decoy records to have risk of re-identification equal to or greater than the defined risk threshold; and defines the one or more decoy records to be unique to each third-party recipient of the anonymized dataset.

19. The computer program product of claim 15, further including an executable portion that traces the re-identification attack using the one or more decoy records to a third-party recipient of the anonymized dataset, wherein the one or more decoy records are unique to the third-party.

20. The computer program product of claim 15, further including an executable portion that uses the one or more decoy records to identify a third-party executing the re-identification attack.

\* \* \* \* \*